US008054784B2

(12) United States Patent
Ren et al.

(10) Patent No.: US 8,054,784 B2
(45) Date of Patent: Nov. 8, 2011

(54) WIRELESS MESH NETWORK CHANNEL SELECTION

(75) Inventors: Wenge Ren, Sunnyvale, CA (US); Devabhaktuni Srikrishna, Sunnyvale, CA (US); Cyrus Behroozi, Menlo Park, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 94 days.

(21) Appl. No.: 11/505,143

(22) Filed: Aug. 16, 2006

(65) Prior Publication Data
US 2008/0043707 A1 Feb. 21, 2008

(51) Int. Cl.
*H04W 4/00* (2009.01)
*H04W 72/00* (2009.01)

(52) U.S. Cl. ........ 370/329; 370/338; 370/341; 455/450; 455/452.1; 455/455; 455/513; 455/434

(58) Field of Classification Search .................. 370/338, 370/329, 341; 455/434, 455, 513, 450, 452.1
See application file for complete search history.

(56) References Cited

U.S. PATENT DOCUMENTS

| | | | |
|---|---|---|---|
| 4,263,656 A | 4/1981 | Yamaguchi et al. | |
| 5,459,676 A | 10/1995 | Livingston | |
| 5,534,875 A | 7/1996 | Diefes et al. | |
| 6,147,612 A | 11/2000 | Ruan et al. | |
| 6,480,497 B1 | 11/2002 | Flammer, III et al. | |
| 6,650,872 B1 * | 11/2003 | Karlsson | 455/67.11 |
| 6,912,204 B2 | 6/2005 | Kossi et al. | |
| 7,020,110 B2 * | 3/2006 | Walton et al. | 370/334 |
| 7,031,293 B1 * | 4/2006 | Srikrishna et al. | 370/348 |
| 7,092,363 B1 | 8/2006 | Majidi-Ahy | |
| 7,127,212 B2 * | 10/2006 | Fattouch | 455/63.1 |
| 7,388,833 B2 * | 6/2008 | Yuan et al. | 370/230.1 |
| 7,489,932 B2 * | 2/2009 | Chari et al. | 455/447 |
| 7,551,562 B2 * | 6/2009 | Srikrishna et al. | 370/236 |
| 7,564,862 B2 * | 7/2009 | Srikrishna et al. | 370/431 |
| 7,668,137 B2 * | 2/2010 | Srikrishna et al. | 370/329 |
| 2002/0097696 A1 | 7/2002 | Kossi et al. | |
| 2002/0176390 A1 | 11/2002 | Sparr et al. | |
| 2002/0181427 A1 | 12/2002 | Sparr et al. | |
| 2004/0010390 A1 | 1/2004 | Kelly et al. | |

(Continued)

OTHER PUBLICATIONS

Jing Zhu, Roy, S. "802.11 mesh networks with two-radio access points", Communications, 2005. ICC 2005, 2005 IEEE International Conference on, vol. 5, May 16-20, 2005 pp. 3609-3615, vol. 5.

*Primary Examiner* — Rafael Pérez-Gutiérrez
*Assistant Examiner* — Allahyar Kasraian
(74) *Attorney, Agent, or Firm* — Brian R. Short

(57) ABSTRACT

An apparatus and method of a gateway selecting transmission channels of a cluster of a wireless mesh network is disclosed. The cluster includes the gateway and a plurality of access nodes. The method includes the gateway cycling through a plurality of available transmission channels, evaluating channel each of the available transmission channels, and selecting a cluster transmission channel based on the channel evaluations. An apparatus and method of a node within a wireless mesh network selecting a transmission channel is also disclosed. The method includes the node cycling through a plurality of available transmission channels, measuring a persistence of successfully received routing packets from upstream devices at each of the available transmission channels, evaluating noise of each of the available transmission channels, and selecting one of the available transmission channels based on the persistence of successfully received routing packets and the noise.

17 Claims, 5 Drawing Sheets

U.S. PATENT DOCUMENTS

| | | | |
|---|---|---|---|
| 2004/0032853 A1* | 2/2004 | D'Amico et al. | 370/349 |
| 2004/0190478 A1 | 9/2004 | Backes et al. | |
| 2004/0213189 A1 | 10/2004 | Alspaugh et al. | |
| 2005/0068970 A1* | 3/2005 | Srikrishna et al. | 370/400 |
| 2005/0122999 A1* | 6/2005 | Scherzer et al. | 370/480 |
| 2005/0271006 A1 | 12/2005 | Chari et al. | |
| 2005/0286440 A1 | 12/2005 | Stutt et al. | |
| 2006/0094370 A1 | 5/2006 | Nguyen | |
| 2006/0094371 A1 | 5/2006 | Nguyen | |
| 2006/0094436 A1* | 5/2006 | Kim et al. | 455/450 |
| 2006/0153081 A1 | 7/2006 | Simonsson et al. | |
| 2006/0171332 A1* | 8/2006 | Barnum | 370/254 |
| 2006/0187866 A1* | 8/2006 | Werb et al. | 370/311 |
| 2006/0268906 A1* | 11/2006 | Kneckt | 370/401 |
| 2007/0010261 A1* | 1/2007 | Dravida et al. | 455/456.3 |
| 2007/0014267 A1* | 1/2007 | Lam et al. | 370/338 |
| 2007/0054625 A1* | 3/2007 | Beale | 455/69 |
| 2007/0133556 A1* | 6/2007 | Ding et al. | 370/395.4 |
| 2007/0195787 A1* | 8/2007 | Alnuweiri et al. | 370/395.4 |
| 2007/0201393 A1* | 8/2007 | Srikrishna et al. | 370/318 |
| 2007/0206528 A1* | 9/2007 | Walton et al. | 370/328 |
| 2007/0223451 A1* | 9/2007 | Ren et al. | 370/352 |
| 2007/0242642 A1* | 10/2007 | Bronez | 370/338 |
| 2007/0275728 A1* | 11/2007 | Lohr et al. | 455/450 |
| 2008/0025269 A1* | 1/2008 | Gupta et al. | 370/338 |

* cited by examiner

WIRELESS MESH NETWORK CHANNEL SELECTION

FIELD OF THE INVENTION

The invention relates generally to wireless communications. More particularly, the invention relates to a method and apparatus of wireless mesh network channel selection.

BACKGROUND OF THE INVENTION

Wireless mesh networks are gaining popularity because wireless infrastructures are typically easier and less expensive to deploy than wired networks. However, wireless infrastructures can be susceptible to environmental conditions and self-interference.

FIG. 1 shows a wireless mesh network that includes gateways 120, 122, 124 connecting client devices 150, 152 to a wired network 110 through access nodes 130, 132, 134, 140, 142. The connections between the gateways 120, 122, 124 and the access nodes 130, 132, 134, 140, 142 can be wireless. Additionally, the connection between the access nodes 130, 132, 134, 140, 142 and the clients 150, 152 can be wireless. The wired network 110 can be connected to the internet 100.

The access nodes and gateways communicate with each other over wireless links. Therefore, the access nodes and gateways typically suffer from self-interference. That is, the access nodes and gateways tend to be somewhat proximate to each other, and typically, can receive at least some transmission signal energy (unintended) from each other. The unintended signal energy interferes with the intended transmission signals, resulting in self-interference.

Wireless networks are also susceptible to interference due to signals generated by electronic devices that are not associated with the networks. The types of interference signals can vary over time as the electronic devices are turned on and off, and relocated.

It is desirable reduce network susceptibility to interference, and self-interference between nodes of the wireless mesh network.

SUMMARY OF THE INVENTION

One embodiment of the invention includes a method of a gateway selecting transmission channels of a cluster of a wireless mesh network. The cluster includes the gateway and a plurality of access nodes. The method includes the gateway cycling through a plurality of available transmission channels, evaluating each of the available transmission channels, and selecting a cluster transmission channel based on the channel evaluations.

Another embodiment of the invention includes a method of a node within a wireless mesh network selecting a transmission channel. The method includes the node cycling through a plurality of available transmission channels, measuring a persistence of successfully received routing packets from upstream devices at each of the available transmission channels, evaluating noise of each of the available transmission channels, and selecting one of the available transmission channels based on the persistence of successfully received routing packets and the noise.

Other aspects and advantages of the present invention will become apparent from the following detailed description, taken in conjunction with the accompanying drawings, illustrating by way of example the principles of the invention.

DETAILED DESCRIPTION

Figure 1:
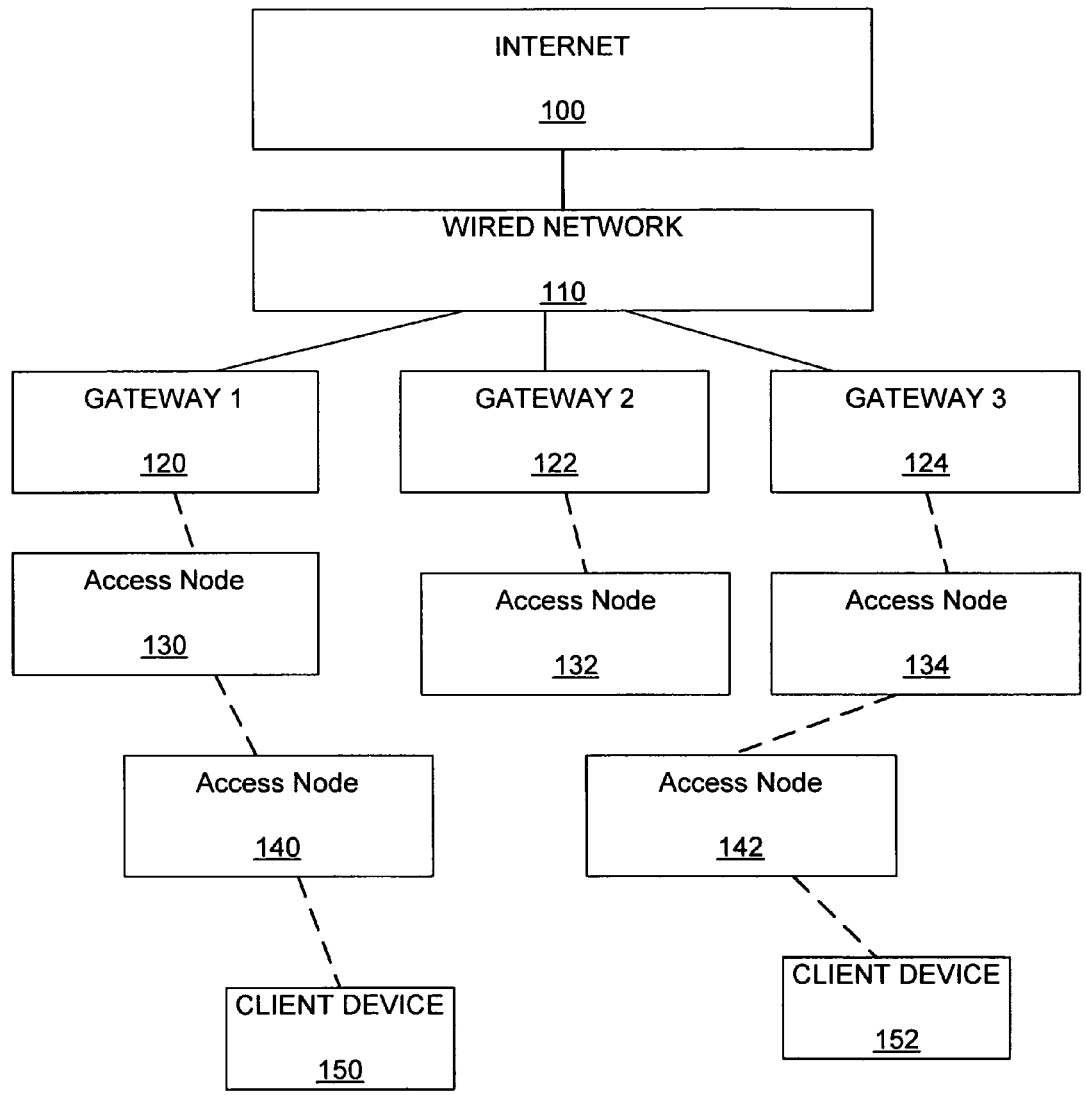
FIG. 1 shows a prior art mesh network.

As shown in the drawings for purposes of illustration, the invention is embodied in an apparatus and method for a gateway to adaptively select a transmission channel of clusters within wireless mesh network. Additionally, the invention includes an apparatus and method for nodes within the wireless mesh network to adaptively select their transmission channels.

Figure 2:
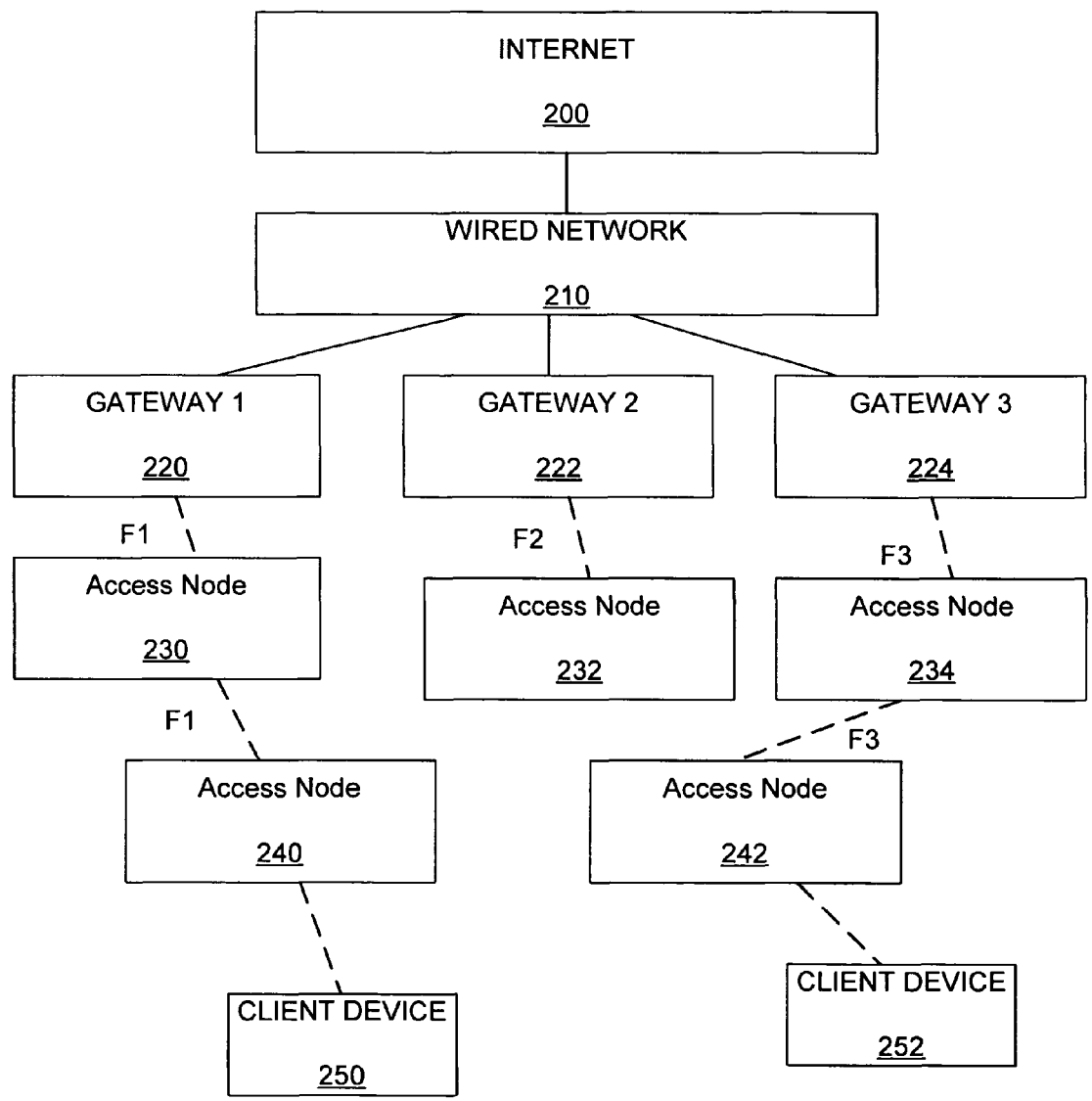
FIG. 2 shows a wireless mesh network in which separate clusters of the network includes separate transmission frequencies.

FIG. 2 shows a wireless mesh network in which separate clusters of the network include separate transmission frequencies. The clusters of FIG. 2 are defined by gateways 220, 222, 224. That is, each gateway defines a separate cluster. A first cluster includes the gateway 220 and associated access nodes 230, 240. A second cluster includes the gateway 222 and associated access node 232. A third cluster includes the gateway 224 and associated access nodes 234, 242. A method of reducing interference between clusters of a wireless mesh network is to select transmission frequencies of proximate clusters to be different. That is, for example, the transmission frequency of the first cluster is set to F1, the transmission frequency of the second cluster is set to F2, and the transmission frequency of the third cluster is set to F3.

The gateways 220, 222, 224 can be wirelessly or wired connected to a wired network 210, which can be connected to the internet 200. The wireless mesh network provides clients (for example, client devices 250, 252) access to the wired network 210.

A client generally can include a laptop computer, a personal digital assistant (PDA), a cell-phone, or any other device that includes as interface card adaptable for use with the mesh network of the invention. The client can access the network though wired or wireless connections. Wireless clients can access the network through a MAC (media access control), PHY (physical layer) protocol such as IEEE 802.11. The 802.11 protocol includes authentication and association protocols between client devices and the network. The client device can include a NIC (network interface card). The wireless clients can include a wireless to wired CPE (consumer premises equipment) bridge designed to accept a wireless backhaul connection while providing wire Ethernet connectivity inside a home. The wireless to wired CPE can connect one or more Ethernet-equipped client device (such as laptops or personal computers) to the wireless access network. Such a configuration can be referred to as "clients behind a CPE". The client device can be directly connected (for example, by Ethernet) to an Ethernet port on a wireless mesh access node. For example, the client device could be an IP video camera attached to an Ethernet port of street-light mounted mesh access node. This type of client device can be referred to as a "wired client".

Setting the transmission frequencies of the proximate clusters to different frequencies mitigates self-interference to some extent. However, typically, there are only a finite number of available transmission frequencies. Therefore, the transmission frequencies must be repeated for at least some clusters of a large wireless mesh network. As a result, some self-interference still occurs. Additionally, as will be described later, the access nodes of a cluster may be able to obtain a better network connection by switching to a different transmission frequency than the one the access node is presently operating at.

Providing gateways and access nodes of a wireless network with the ability to adaptively select transmission frequencies can help mitigate the effects of self-interference, and interference due to external electronic devices. Previously selected transmission frequencies can become less desirable over time due to external interfering signal generated by other electronic devices, such as, other 802.11 devices, cordless phones and blue-tooth devices. Also, previously selected transmission frequencies can become less desirable due to environment effects, such as, moving objects and falling leaves of trees. Additionally, previously selected transmission frequencies can become obsolete as the wireless network grows and changes over time.

Figure 3:
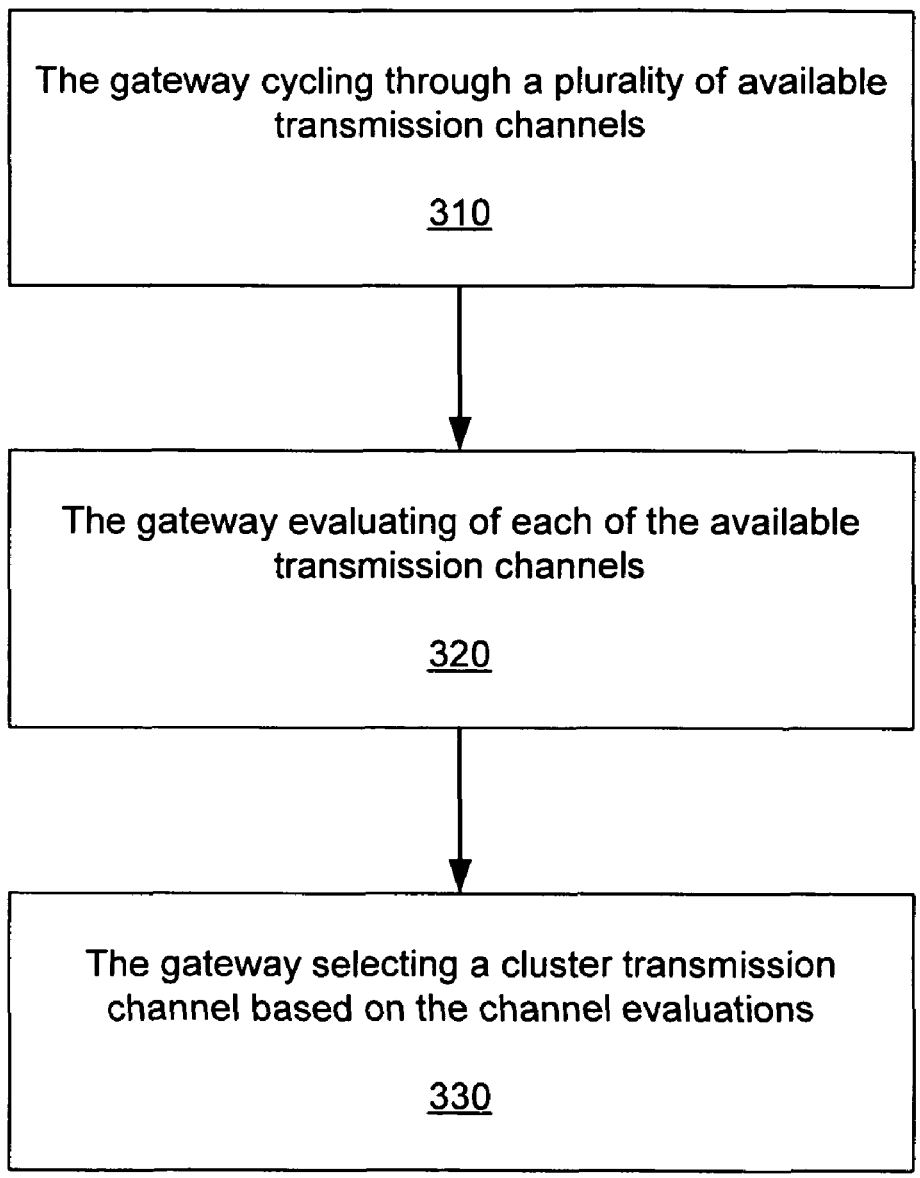
FIG. 3 is a flow chart that shows steps of one example of a method of a gateway adaptively selecting a transmission channel.

FIG. 3 is a flow chart that shows steps of one example of a method of a gateway adaptively selecting a transmission channel. A first step 310 includes the gateway cycling through a plurality of available transmission channels. A second step 320 includes the gateway evaluating each of the available transmission channels. A third step 330 includes the gateway selecting a cluster transmission channel based on the channel evaluations.

The channel evaluation can include any combination of the channel contention, channel noise and/or a percentage of time a channel is clear. Other channel conditions can additionally, or alternately be evaluated as well.

Cycling Through Available Channels

Generally, a wireless mesh network has a set of available transmission frequencies. For example, an 802.11(b) wireless network can include transmission channel frequencies of 2.412 GHz, 2.417 GHz, 2.422 GHz, 2.427 GHz, 2.432 GHz, 2.437 GHz, 2.442 GHz, 2.447 GHz, 2.452 GHz, 2.457 GHz, 2.462 GHz.

Depending upon the proximity of neighboring clusters, the transmission frequencies of the neighboring clusters, and the environment of the wireless network, self-interference between the clusters of the wireless network can vary depending upon the transmission frequencies of each of the clusters. Cycling each cluster through all of the available transmission frequencies allows each cluster to evaluate the contention and noise to determine which of the available transmission frequencies is the best.

The cycling can be as simple as progressively stepping through each of the available transmission frequencies. However, the cycling can be configurable and include some intelligence. For example, contention of one channel influences to some extent contention of a neighboring channel. Therefore, it can be more efficient to skip available channels in the scheduling. For example, for 11 available channels, the sequence could be 1-3-5-7-9-11 or 2-4-6-8-10. However, any sequence is possible.

Evaluating Channel Contention

Several different possible methods can be used for evaluating the channel contention. One example includes the contention evaluating node (gateway) determining how many other clusters with similar devices can be received in the channel being evaluated. A similar device can be defined as devices having a MAC address within a common, unique range. This can indicate, for example, that the devices are of a common manufacturer. Routing packets, (beacons) as described later, can include a gateway address that allows for identification of the other clusters. The evaluating gateway can determine contention by counting the number of other clusters that the evaluating gateway receives routing packets from.

Another example includes the contention evaluating gateway determining how many other similar devices (gateways and access nodes) that the evaluating gateway can receive 802.11 signals above a predetermined threshold signal level from. The MAC address of the 802.11 signal can be used to identify the source of the 802.11 signal.

Another example includes the contention evaluating gateway determining how many 802.11 signal generating devices (similar or not) that the evaluating gateway can receive 802.11 signals above a predetermined threshold from.

Evaluating Channel Noise

Generally, 802.11 chip sets provide channel noise estimates of a channel. One example of evaluating channel noise includes averaging many of these noise estimates over a predetermined period of time. Noise estimates that deviate greatly from the other estimates can be tossed out and not included within the average because it can be assumed that these estimates are erroneous. The noise evaluating process can be repeated once every predetermined period of time. The mesh network can adjust the predetermined period depending upon the stability of the channel noise of the network.

A gateway evaluation of the channel noise can additionally include feedback from access nodes of the cluster of the gateway. The access nodes can use processes that are similar to the channel noise evaluating processes of the gateway. That is, the access nodes can average channel noise estimates over time, while neglecting estimates that are obviously bad. One embodiment includes the access node only feeding back estimated channel noise when the estimated channel noise of the access node is greater than a predetermined threshold.

Evaluating the Percentage of Time the Channel is Clear

The gateway or access node can evaluate the percentage of time the channel is clear by monitoring the percentage of time that, for example, other 802.11 devices are using the channel.

Selecting a Channel

Channel transmission frequency selection is based on the channel evaluation. As described, the channel evaluation can include evaluations of channel contention, channel noise and/or a percentage of time a channel is clear. One embodiment of the channel evaluation includes channel contention and channel noise evaluations. An example of a method of selecting the channel transmission frequency includes first dropping all channels that have an evaluated noise greater than a predetermined threshold. Of the channels that are left, the channel having the least amount of contention is selected. If none of the available transmission channels have a channel noise estimate of greater than the predetermined threshold, then the transmission channel having the least contention is selected.

Initiation of Cycling Through Available Transmission Frequencies

Several different criteria can be used to initiate cycling between the available transmission channels. For gateways, the cycling through the available transmission channels can be initiated by a clocked maintenance. That is, for example, the cycling can be initiated once every predetermined number of days. Changes in the conditions of the wireless network can be accounted for by updated the transmission frequencies of the clusters.

Both gateways and access nodes can initiate or trigger cycling through the available transmission channels by detecting the channel noise exceeding a threshold. The channel noise can be monitored once every predetermined period of time (for example, once every 10 minutes). As previously described, channel noise estimates can be averaged with the obviously bad estimates tossed out. If the average exceeds a predetermined threshold, the transmission frequency cycling is initiated.

Both gateways and access nodes can initiate or trigger cycling through the available transmission channels by detecting the channel only being clear a predetermined percentage of time. The gateway or access node can monitor the percentage of time that, for example, other 802.11 devices are using the channel. If over a predetermined duration of time, the other 802.11 devices are using the channel greater than a predetermined percentage of the time, then the transmission frequency cycling is initiated.

Scheduling Cycling Within Clusters

Once a gateway has determined a schedule of the cycling through the available transmission channels, the gateway communicates the schedule to the access nodes of the cluster. This allows the access nodes of the cluster to change their transmission channels along with the gateway. The schedule includes the channel sequence of the cycling along with the timing and duration of each of the transmission channels. For example, the sequence could be channels 1-6-11 in which each channel is evaluated for one minute a piece. The access nodes can then tune their transmission channels according to the timing, duration and sequence of the cycling schedule.

Scheduling Cycling Between Clusters

Many different clusters can exist within a wireless mesh network. Each of the clusters can include the adaptive channel selection capabilities. It is desirable to have clusters that are proximate to each other (that is, they are close enough to wirelessly receive communication signals from each other) execute their frequency channel cycling at different times.

One embodiment includes each gateway receiving information from other gateways of neighboring clusters, allowing the gateway to avoid cycling through the plurality of available transmission channels while the neighboring clusters are cycling through transmission channels. The information is received through wireless connection rather than through, for example, a back haul wired connection.

The gateway can then coordinates its cycling through the plurality of available transmission channels based on the information received from the other gateways of the neighboring clusters. The other gateways can similarly coordinate their cycling through the available transmission channels.

Another embodiment includes each gateway and the gateways of the neighboring clusters each perform cycling through the transmission channels at randomized times within a predetermined range of start times. The randomization of the start times make is probable that neighboring gateways will execute their cycling at different times.

Figure 4:
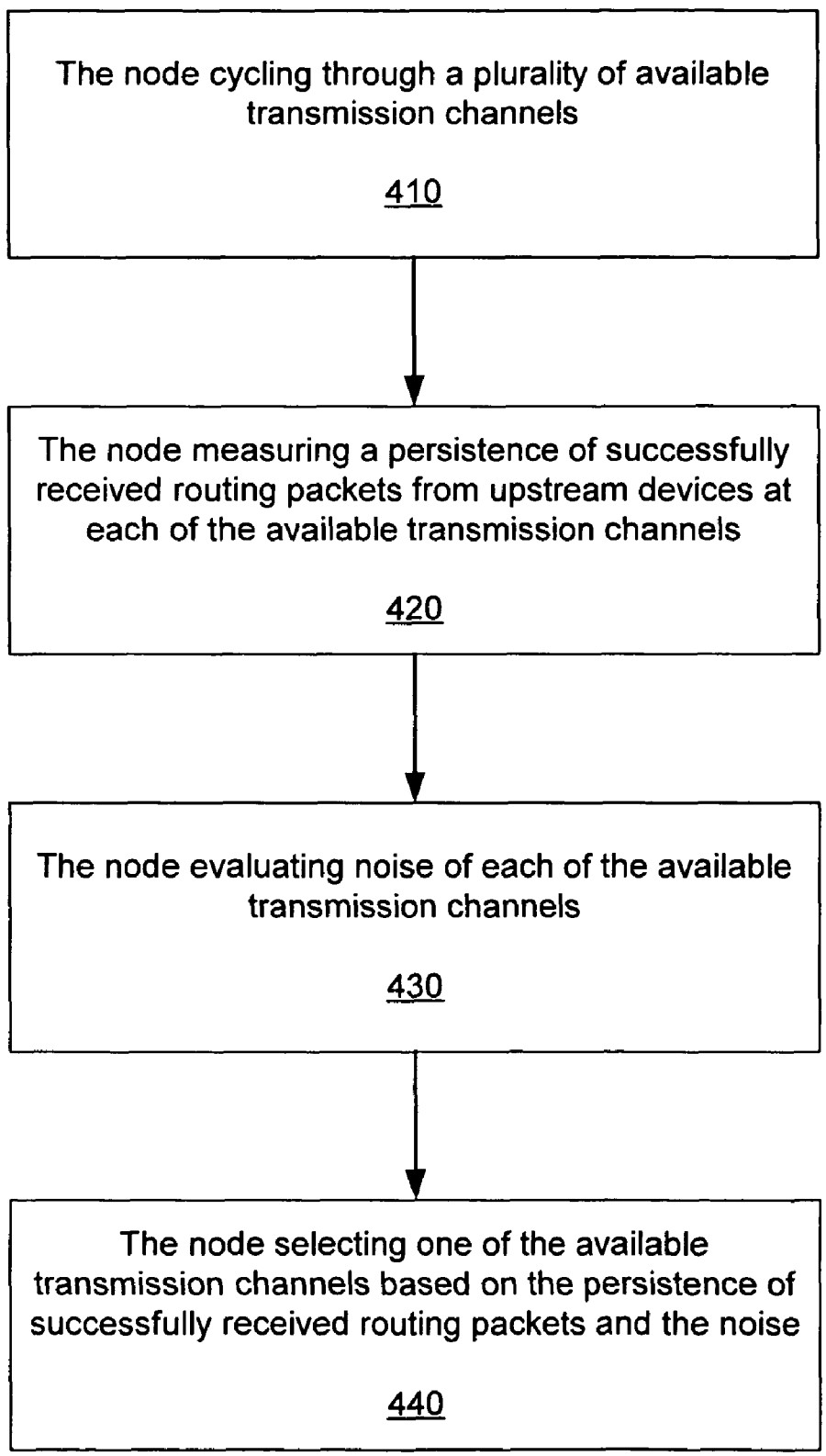
FIG. 4 is a flow chart that shows steps of one example of a method of a node within a wireless mesh network adaptively selecting a transmission channel.

FIG. 4 is a flow chart that shows steps of one example of a method of a node within a wireless mesh network adaptively selecting a transmission channel. A first step 410 includes the node cycling through a plurality of available transmission channels. A second step 420 includes the node measuring a persistence of successfully received routing packets from upstream devices at each of the available transmission channels. A third step 430 includes the node evaluating noise of each of the available transmission channels. A fourth step 440 includes the node selecting one of the available transmission channels based on the persistence of successfully received routing packets and the noise.

An alternate embodiment includes removing the third step 430 of evaluating the noise of each available transmission channel, and basing the fourth step 440 of selecting one of the available transmission channels on the persistence of the received routing packets, not the noise.

As previously described, the gateways of cluster transmit schedules for the transmission channel cycling. The access nodes receive the schedules, and cycling through the plurality of available transmission channels is initiated by the schedule received from the default gateway of node. The default gateway is the gateway of a most recently selected route.

The access nodes, however, can initiate cycling based on other conditions as well. For example, an access node can initiate cycling through the plurality of available transmission channels by detecting a persistence of routing packets originating from a default gateway of the node falling below a predetermined threshold. As will be described later, the access node selects routing through the mesh network based on routing packets that originate at gateways and are re-broadcast by access nodes. The persistence of received routing packets can be used to determine that quality of a link between the access node and an upstream device (other access node or a gateway). If the persistence falls below a threshold, this can be an indication that a better link could be found on a different transmission channel. Cycling the transmission channels can lead to a better link, and therefore routing path, to a different gateway.

The access node can also initiate cycling through the plurality of available transmission channels by the node sensing noise above a predetermined threshold, or the node sensing a percentage of time a present channel is not clear. The channel noise can be sensed using the channel noise averaging process described earlier. The percentage of time a present channel is clear can also be determined as previously described.

The access node selects the transmission channel based on the persistence of successfully received routing packets. This transmission channel is assumed to be the best quality routing path between the access node and an upstream gateway.

Figure 5:
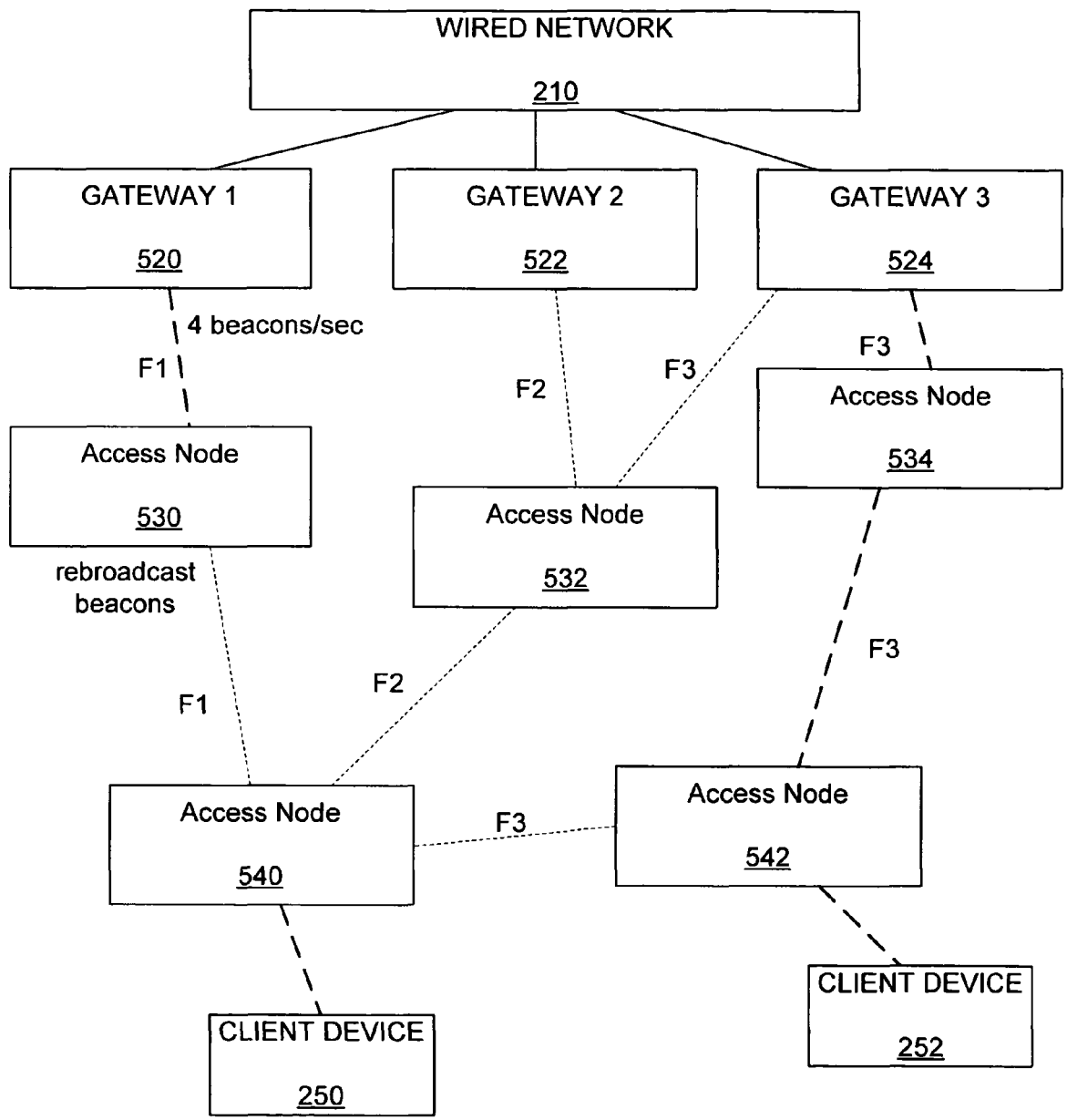
FIG. 5 shows a mesh network that includes several clusters, in which the clusters include access nodes that select routing paths to gateways of the clusters while cycling through available transmission frequencies.

FIG. 5 shows a mesh network that includes several clusters, in which the clusters include access nodes that select routing paths to gateways of the clusters while cycling through available transmission frequencies.

Access Node Routing Selections

Access nodes 530, 532, 534, 540, 542 are coupled either directly or indirectly to the gateways 520, 522, 524. That is, each access node is either directly connected to one of the upstream gateways 520, 522, 524, or indirectly connected through another access node to one of the upstream gateway 520, 522, 524. Many factors can be included in the decision of which access nodes or gateways each access node is connected. The mesh network of FIG. 5 can include any number of additional gateways and access nodes. As shown in FIG. 5, clients 250, 252 can obtain access to the network by establishing a connection to an available access node, such as, any of access nodes 540, 542.

The gateways 520, 522, 524 broadcasts routing packets (beacons), which can be used to determine routing paths between access nodes 530, 532, 534, 540, 542 and the gateways 520, 522, 524 of the network. The beacons are received by all first-level access nodes (for example, access nodes 530, 532, 534), which are access nodes that are able to receive gateway transmitted beacons, and directly route data through to a gateway.

The beacons are used to establish a route from each access node to a gateway. The first level access nodes re-broadcast the beacon data, attaching their own information to the beacon. The information indicates to the second level access nodes that the path to the gateway includes the first level access node. The first level access nodes re-broadcast the beacons, after adding first level access node information. The information indicates to the second level access nodes that the path to the gateway includes the first level access node. The rebroadcast information can include the addresses of all upstream access nodes along the path to the gateway access node. That is, an embodiment includes each access node that receives routing beacons, modifying the routing beacons of a selected route by attaching an address of the access node, and re-broadcasting the modified beacons.

For one embodiment, the link quality of the beacon received determines whether that beacon is rebroadcast by the access node. If the quality of the beacon is above a determined threshold, it is rebroadcast. Another embodiment includes each access node only re-broadcasting beacons received from its currently-chosen default gateway (the default gateway is the last selected upstream gateway). The beacons can be used to determine the quality of the link in both an upstream (towards a gateway) direction, and in a downstream (away from a gateway) direction. The upstream and the downstream direction link qualities can be used by each access node to select the best data routing path to a gateway. The link qualities can be influenced by other wireless transmission factors such as interference, noise and fading. The link qualities can be determined be calculating the percentage of beacons that are transmitted and successfully received. The link qualities can alternatively be determined by measuring a PER, BER or SNR of received routing beacons.

Asymmetrical characteristics of the links between access nodes and the gateways can lead to non-optimal routing selections if, for example, the quality of the upstream direction links is not included in routing decisions by access nodes to gateways. Each gateway and access node transmits beacons. All access nodes and gateways that receive the beacons can make an estimate of the quality of the link based upon the reception of the beacons. The estimates can include both upstream direction link quality and downstream direction link quality. Once each access node has the upstream and downstream link qualities within every possible data path to a gateway, the access node can make a selection of the best available data path.

Each access node has at least one upstream node, and may have a plurality of downstream nodes. Upstream nodes are the nodes that are between the access node and the gateway. For a level one access node, there is only one upstream node, the gateway. For a level four access node, there are four upstream nodes, which define the access node's path to the gateway. Downstream nodes are nodes that receive the beacon from a particular access node, and define their path to the gateway through that access node.

FIG. 5 also includes a second level access nodes 540, 542. The second level access nodes select that best quality links to first level access nodes (assuming there are no links to gateways of better quality). Again, the first level access node rebroadcast successfully received routing packets. The link quality can be determined be calculating the percentage of beacons that are transmitted and successfully received by the second level access nodes.

The number of levels of the access nodes of the mesh network is not limited. Each access node can select the best path to an upstream gateway by determining the persistence of received routing beacons.

Access Node Routing Selections During Transmission Frequency Cycling

The access nodes can receive upstream routing beacons from any upstream device (another access node or a gateway) while cycling through the available transmission channels. Therefore, an access node can change to a new cluster when cycling through the available transmission frequencies if a better path to another gateway is discovered.

As previously described, an embodiment includes the access nodes of the mesh network receiving a schedule of when the default gateway of the cluster of the access node is going to cycle through the available transmission channels. The access node can remain with the present cluster if the access node determines that the present cluster provides the best path to an upstream gateway. FIG. 5 shows that the access node 540 can select one of the upstream access node 530, 532, 542 depending upon which upstream access node provides the best path to an upstream gateway 520, 522, 524. The transmission frequencies of each of the upstream access nodes can be different (as shown, as F1, F2, F3). Access node 532 can select an upstream gateway 522 or 524 over transmission frequencies F2 or F3 depending upon with transmission channel provides the best link to one of the upstream gateways 522, 524.

The frequency channel cycling of an access node can be sped up if the access node is not receiving any routing packets over transmission channel being evaluated. That is, if the access node tunes to a transmission channel and does not receive any routing packets, the access node can immediately skip to the next transmission channel of the schedule. This, however, only applies to access node initiated transmission channel cycling. If a gateway initiates the transmission channel cycling, the access node will typically have to follow the transmission cycling schedule generated by the gateway.

Although specific embodiments of the invention have been described and illustrated, the invention is not to be limited to the specific forms or arrangements of parts so described and illustrated. The invention is limited only by the appended claims.

What is claimed:

1. A method of a gateway selecting transmission channels of a cluster of a wireless mesh network, the cluster comprising the gateway and a plurality of downstream access nodes, the method comprising:
   the gateway cycling through a plurality of available transmission channels;
   the gateway evaluating each of the available transmission channels;
   the gateway selecting a cluster transmission channel based on the channel evaluation;
   the gateway communicating a schedule of the cycling through the plurality of available transmission channels to the plurality of downstream access nodes of the cluster, wherein the schedule includes a channel sequence of cycling along with timing and duration of each of the available transmission channels;
   each of the plurality of downstream access nodes cycling through the channel sequence of the plurality of available transmission channels according to the schedule received from the gateway, and measuring a channel quality at each of the available transmission channels;
   each of the downstream nodes comparing the measured channel quality at each of the available transmission channels, and selecting one of the available transmission channels based on the measure channel quality at each of the available transmission channels.

2. The method of claim 1, wherein the gateway evaluating of each of the available transmission channels comprises the gateway evaluating a percentage of time of each of the available transmission channels is clear.

3. The method of claim 2, wherein evaluating a percentage of time a channel is clear comprises determining whether other 802.11 devices are using the channel over a period of time.

4. The method of claim 1, wherein the gateway evaluating of each of the available transmission channels comprises the gateway evaluating channel contention each of the available transmission channels.

5. The method of claim 4, wherein evaluating channel contention comprises counting a number of other devices the gateway can receive having signals having a MAC address with a specified range.

6. The method of claim 4, wherein evaluating channel contention comprises counting a number of other devices the gateway can receive having 802.11 signals.

7. The method of claim 1, wherein the gateway evaluating of each of the available transmission channels comprises the gateway evaluating channel noise of each of the available transmission channels.

8. The method of claim 7, wherein evaluating channel noise comprises averaging channel noise estimates over a period of time.

9. The method of claim 1, wherein selecting a cluster transmission channel comprises:
eliminating transmission channels having an average estimated noise above a predetermined noise threshold;
from non-eliminated channels, selecting the cluster transmission channel as the transmission channel having a least amount of contention.

10. The method of claim 1, wherein cycling through the available transmission channels is initiated by a clocked maintenance.

11. The method of claim 1, wherein cycling through the available transmission channels is triggered by the gateways detecting a noise level.

12. The method of claim 1, wherein cycling through the available transmission channels is triggered by detecting a percentage of time the channel is clear.

13. The method of claim 1, wherein each of the downstream nodes measuring a channel quality at each of the available transmission channels comprises:
the downstream nodes measuring a persistence of successfully received routing packets from upstream devices at each of the available transmission channels.

14. The method of claim 1, further comprising the gateway receiving additional channel contention and channel noise evaluations from the access nodes of the wireless mesh network.

15. The method of claim 1, further comprising the gateway receiving information from other gateways of neighboring clusters, allowing the gateway to avoid cycling through the plurality of available transmission channels while the neighboring clusters are cycling through transmission channels.

16. The method of claim 15, wherein the gateway coordinates cycling through the plurality of available transmission channels based on the information received from the other gateways of the neighboring clusters.

17. The method of claim 15, wherein the gateway and the gateways of the neighboring clusters each perform cycling through the transmission channels at randomized times within a predetermined range of start times.

* * * * *